No. 798,848. PATENTED SEPT. 5, 1905.
E. C. WARREN.
ROTARY ENGINE.
APPLICATION FILED NOV. 29, 1901.
13 SHEETS—SHEET 1.
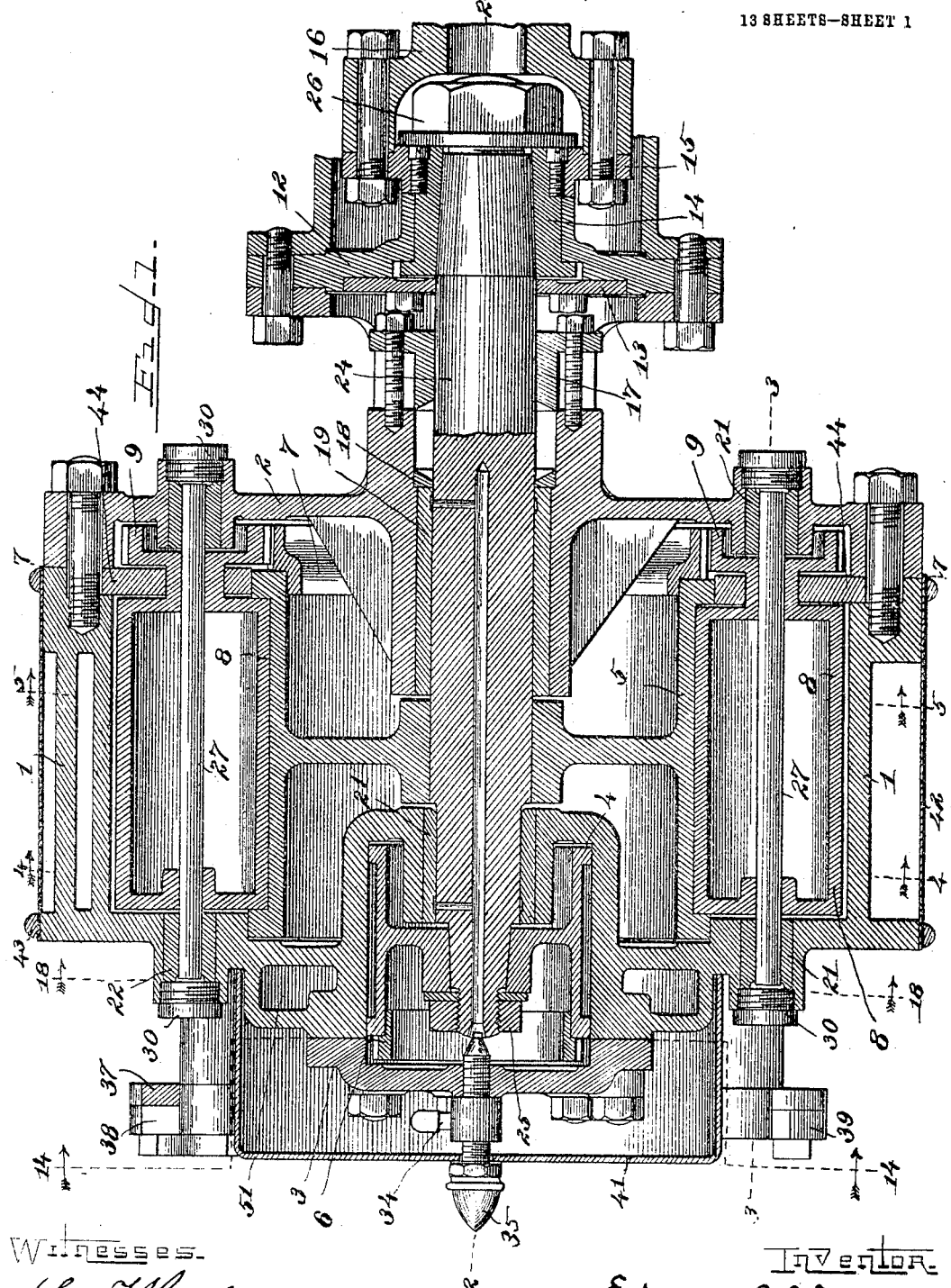
Witnesses.
L. Weissberg
O. C. Friberg
Inventor.
Edward C. Warren
by Chas. L. Page
Atty

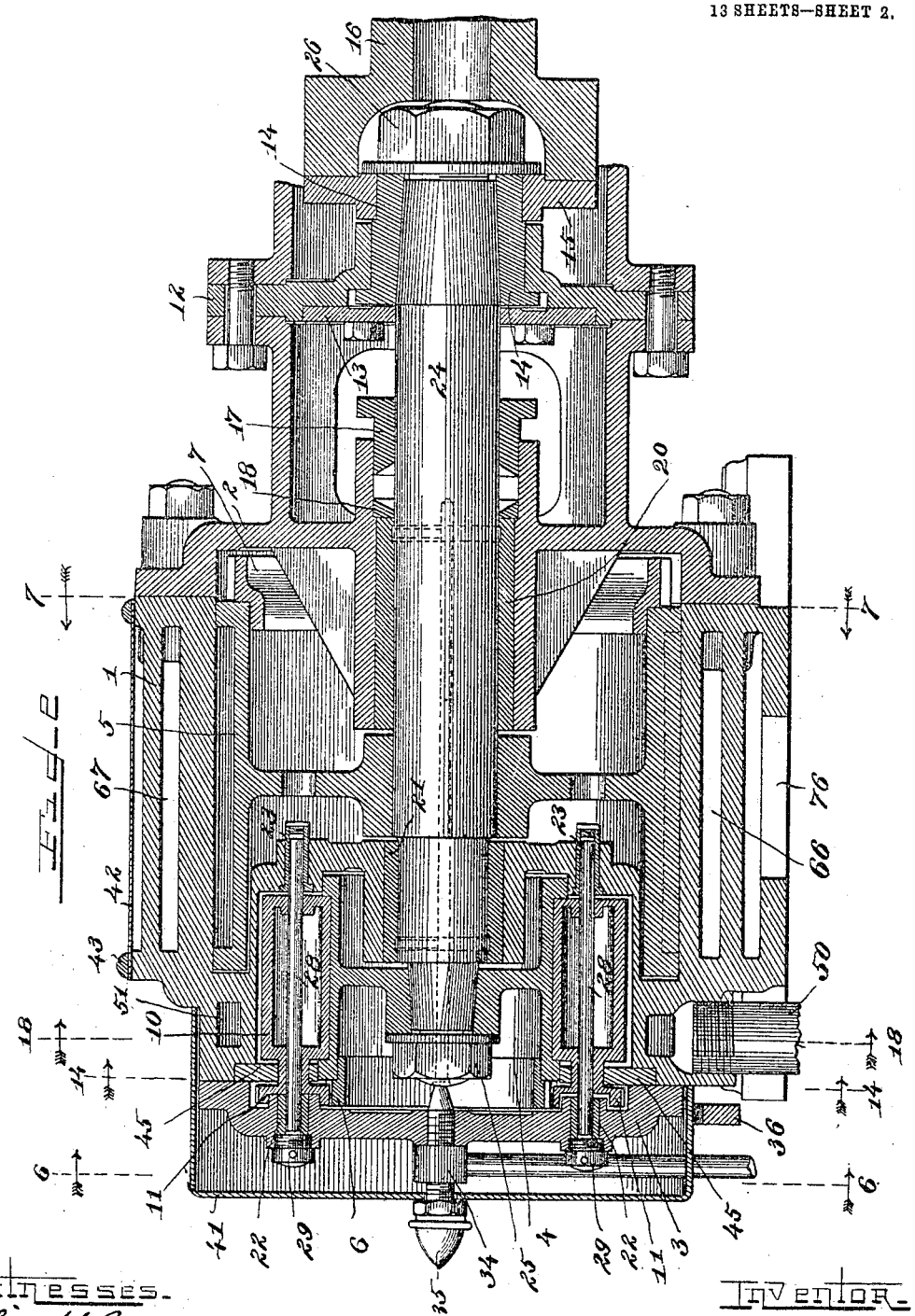

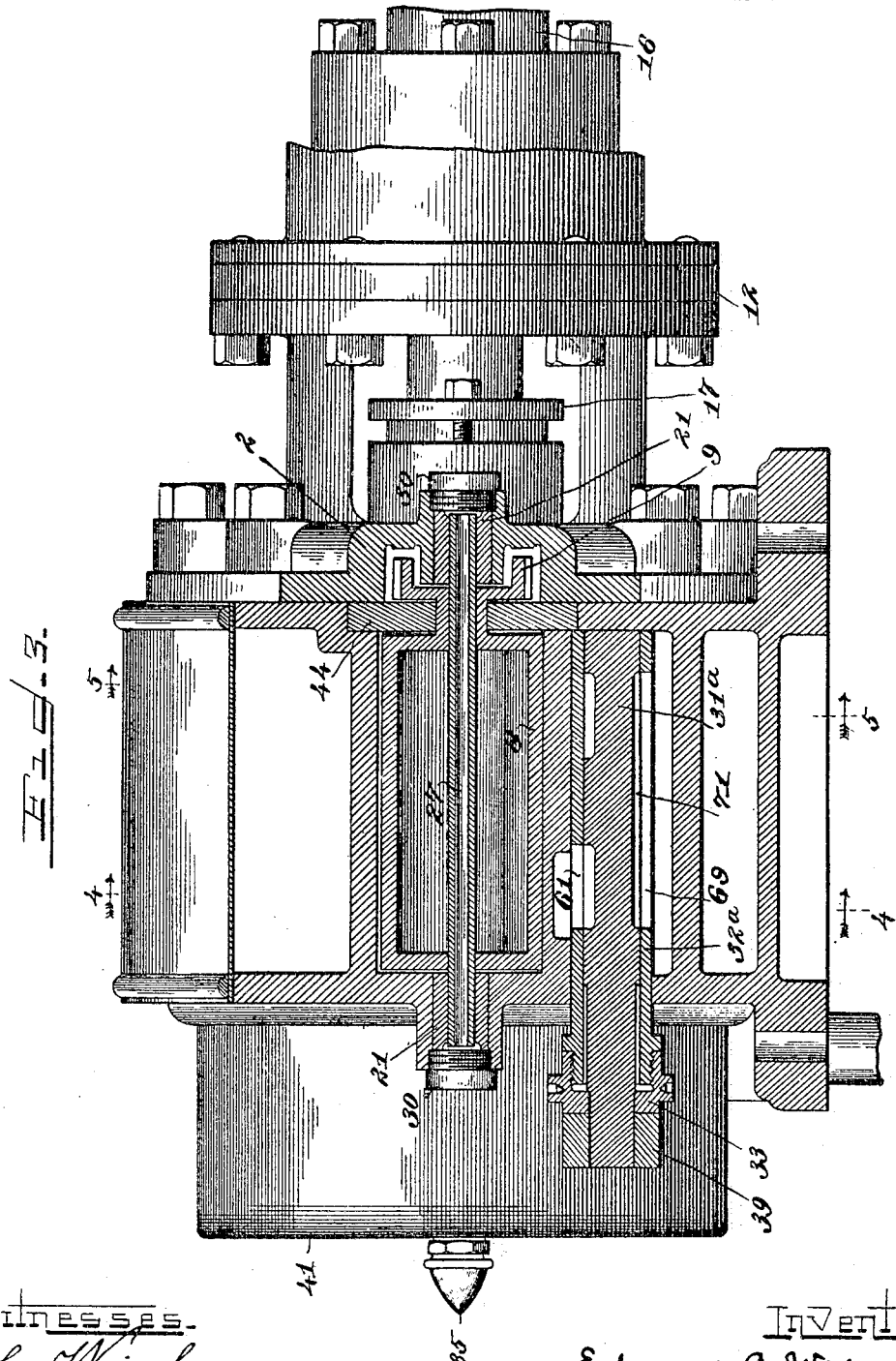

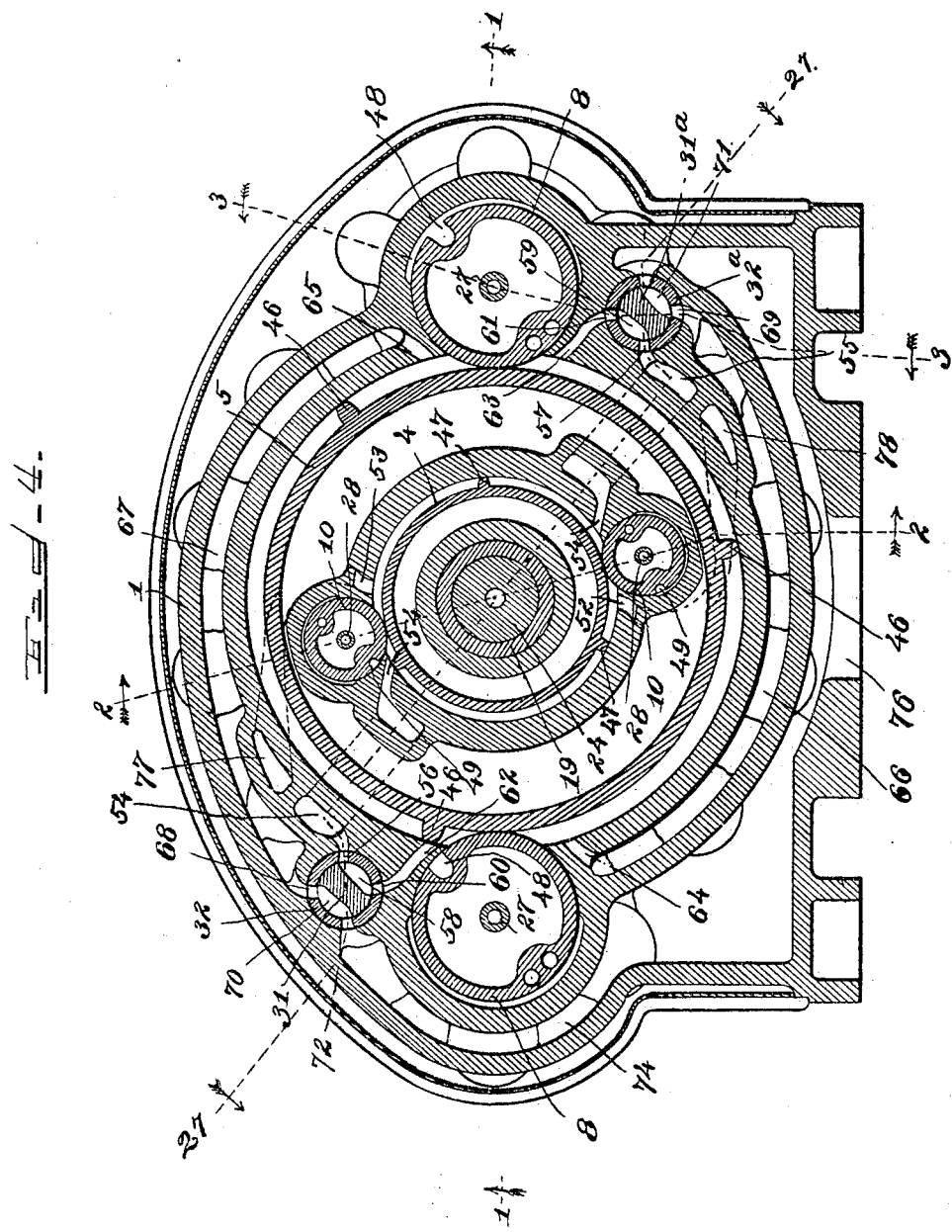

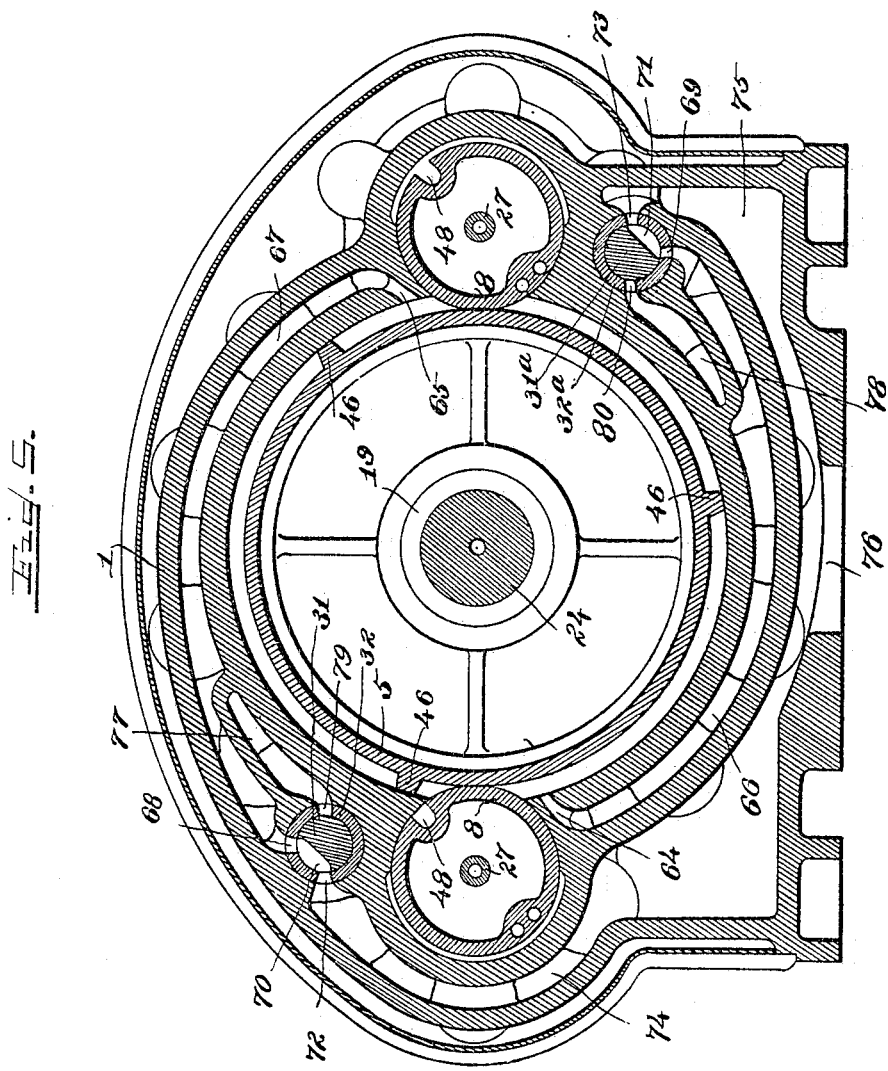

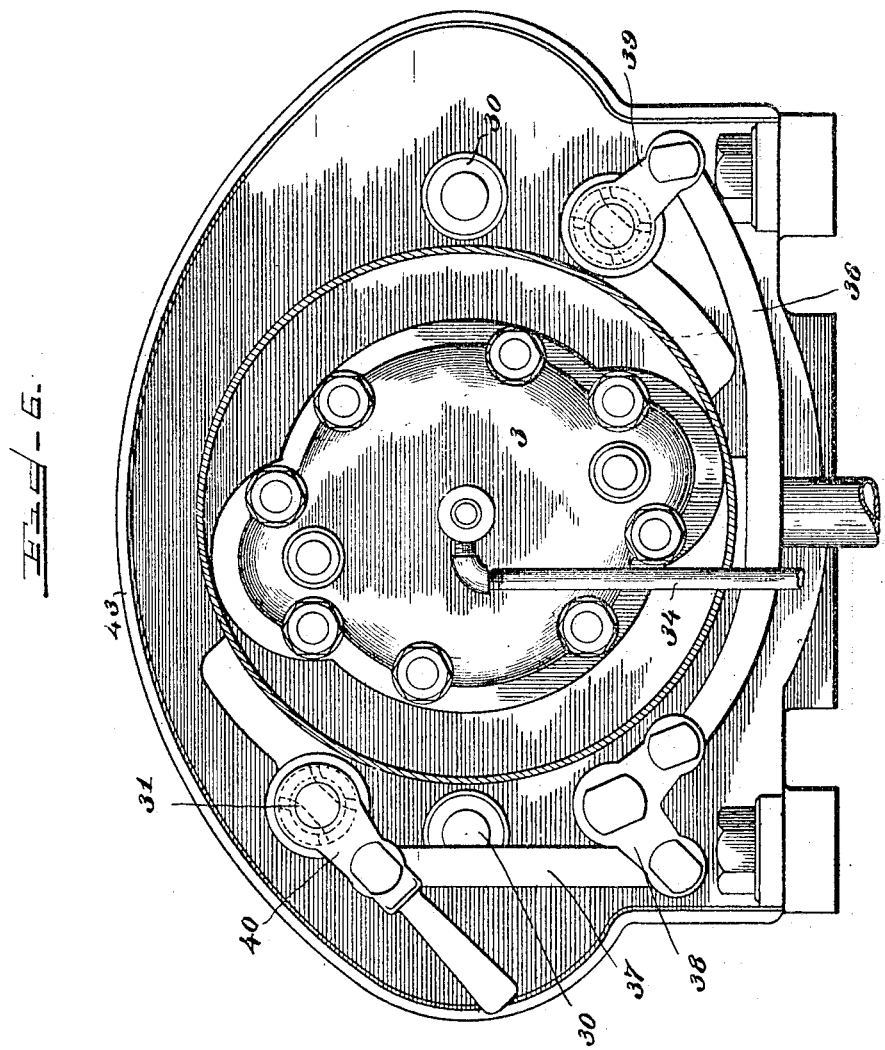

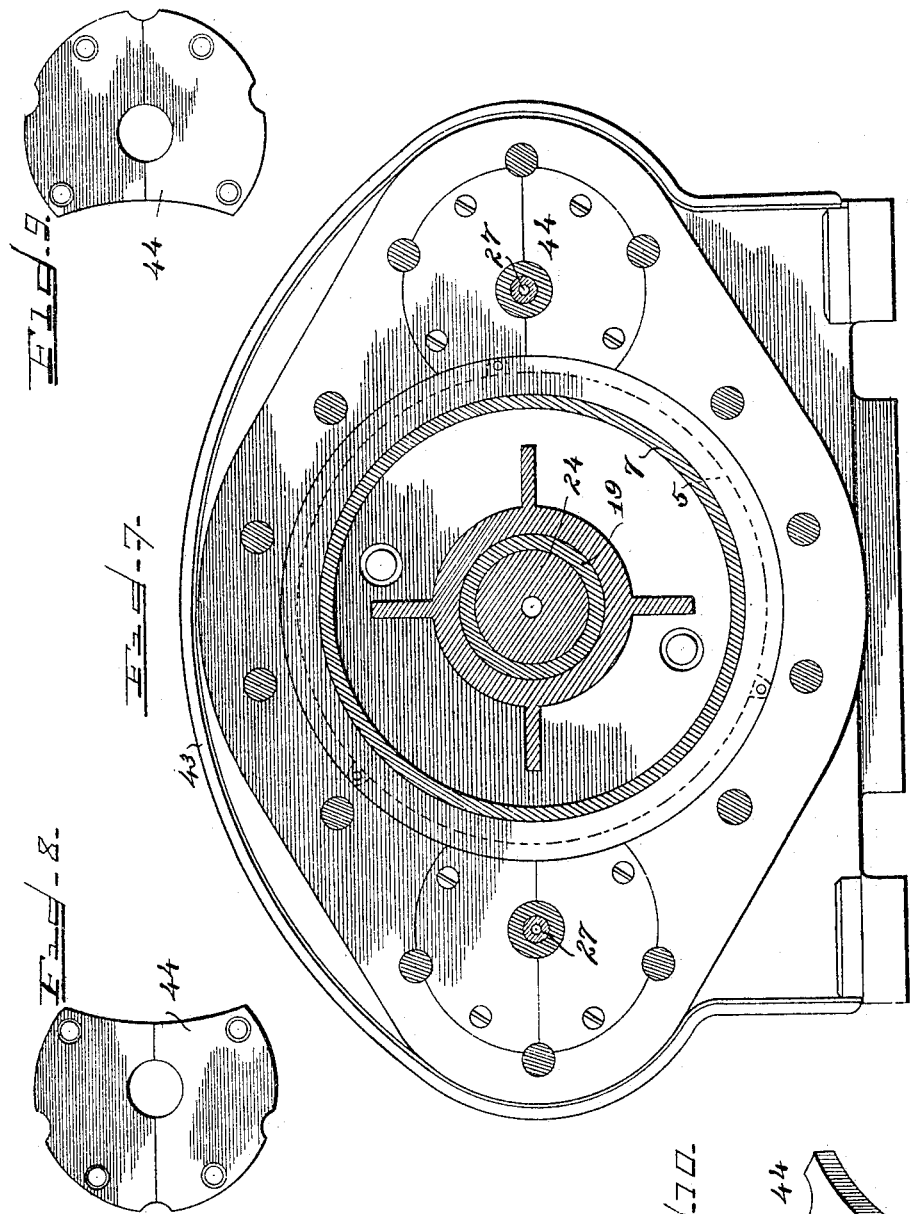

No. 798,848. PATENTED SEPT. 5, 1905.
E. C. WARREN.
ROTARY ENGINE.
APPLICATION FILED NOV. 29, 1901.
13 SHEETS—SHEET 8.
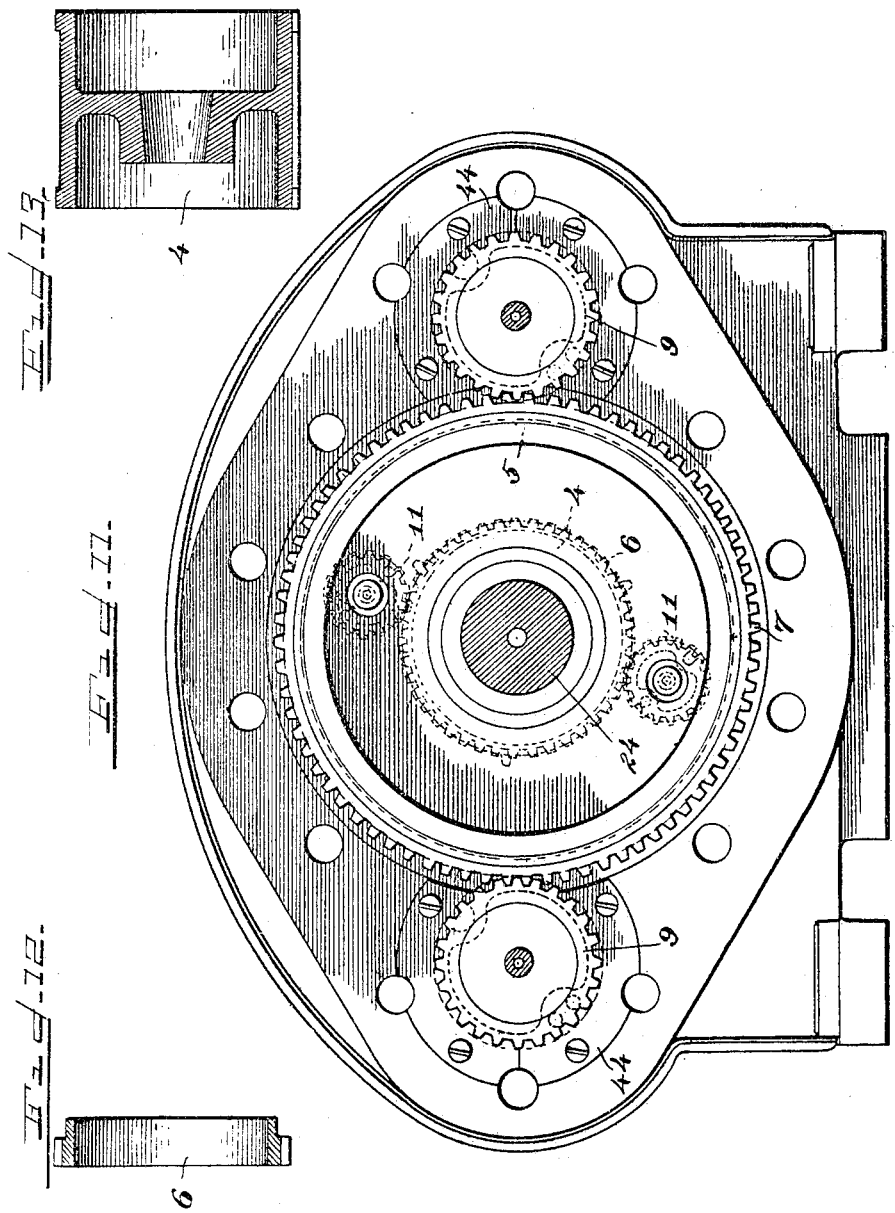
Witnesses.
L. Weissberg
O. C. Friberg
Inventor
Edward C. Warren
by Chas. E. Page
Atty

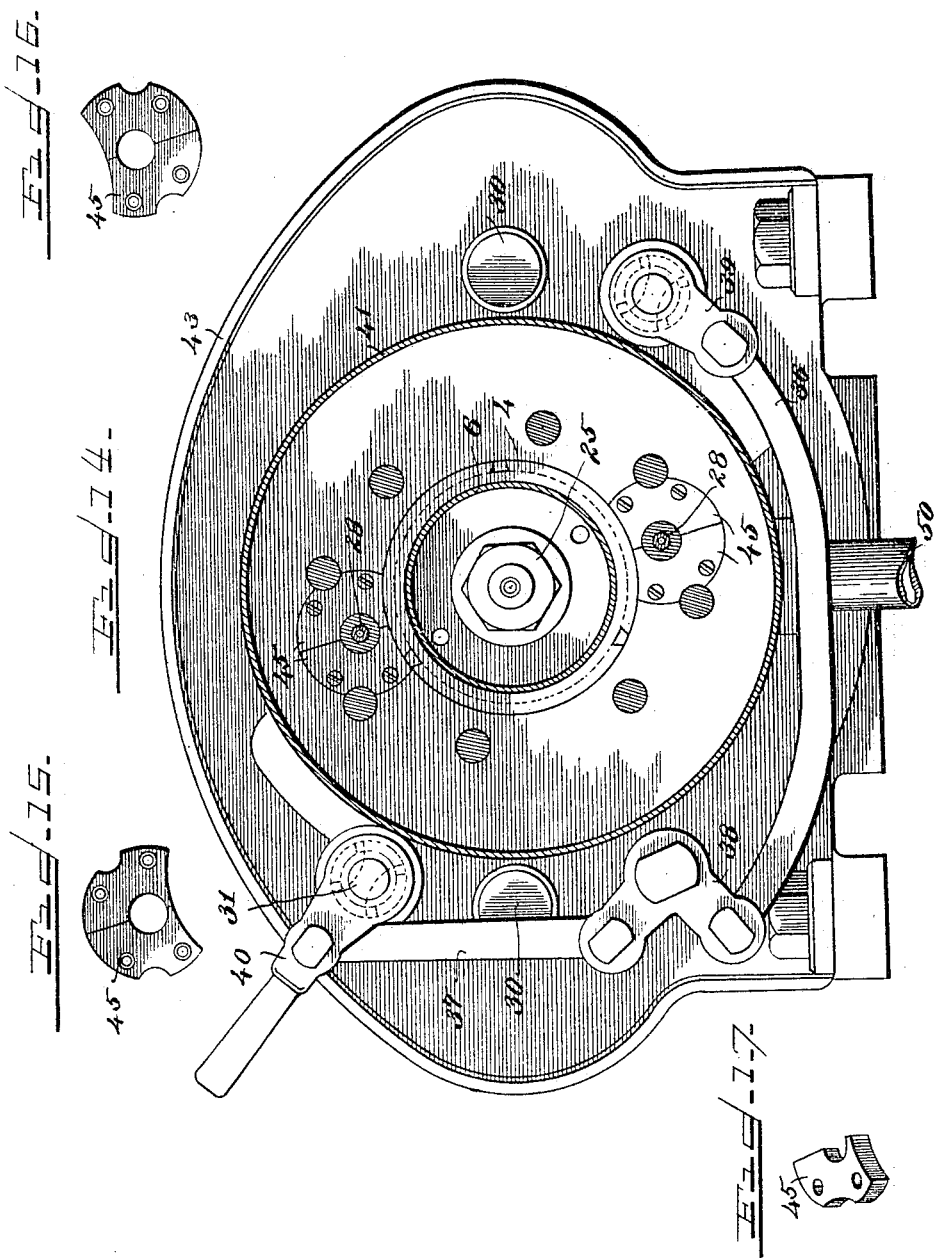

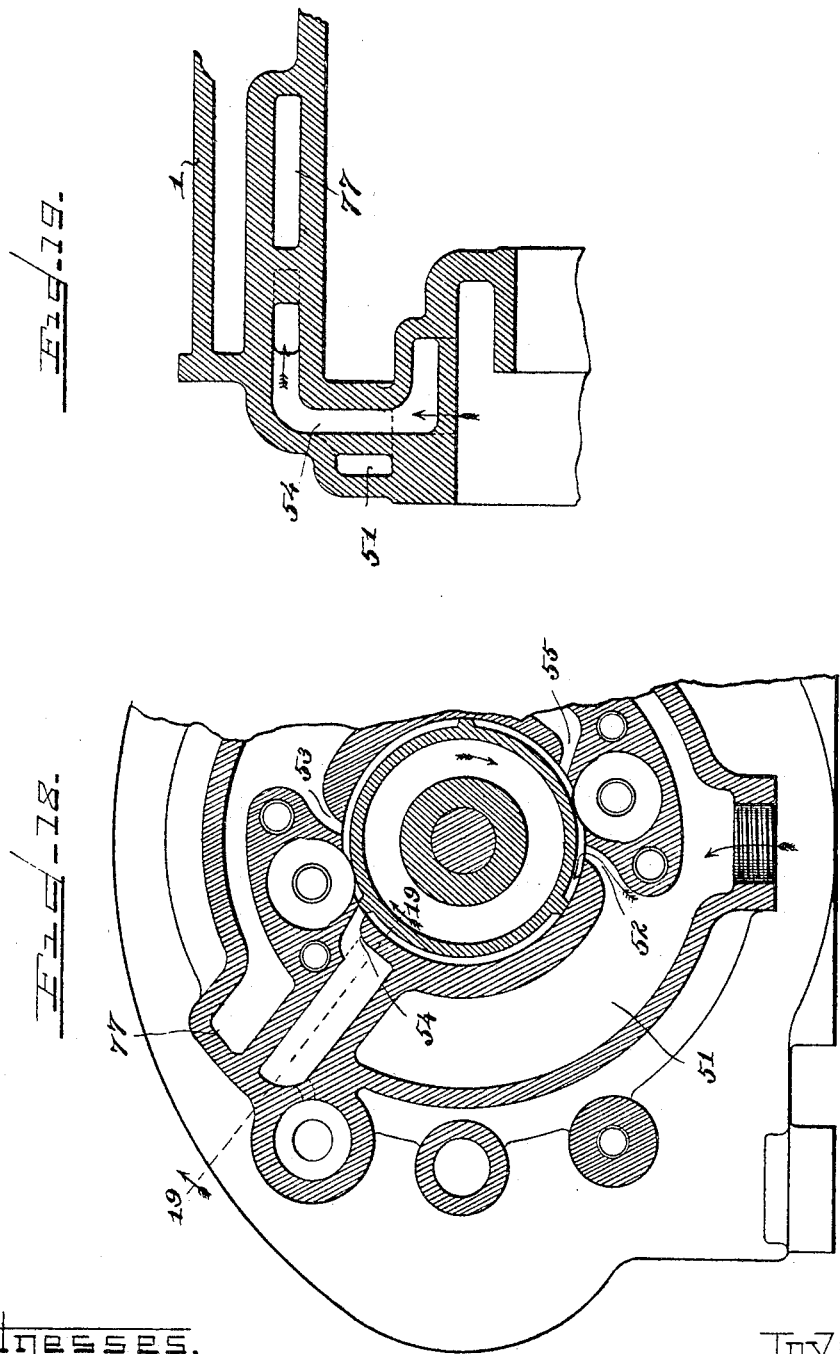

No. 798,848. PATENTED SEPT. 5, 1905.
E. C. WARREN.
ROTARY ENGINE.
APPLICATION FILED NOV. 29, 1901.
13 SHEETS—SHEET 11.
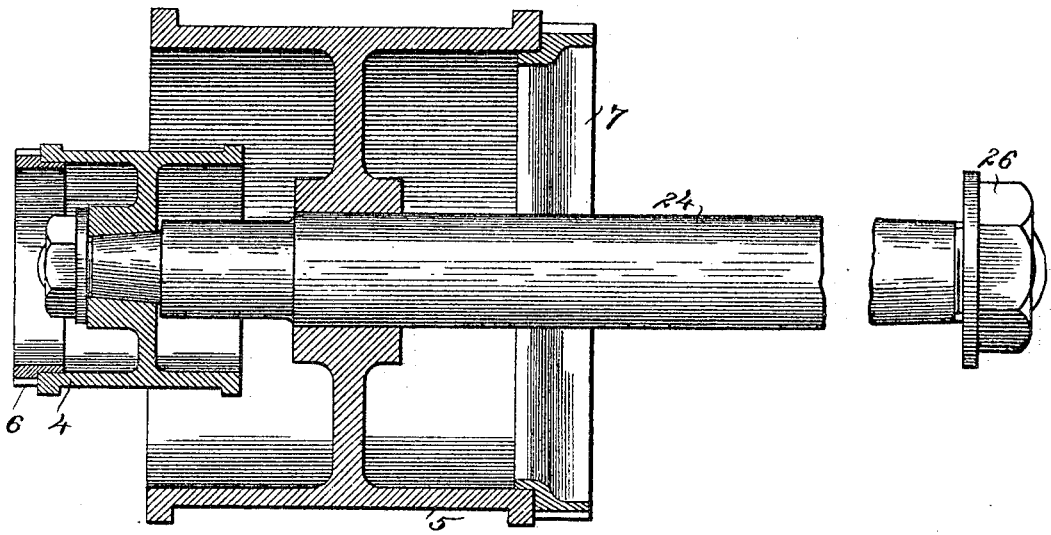
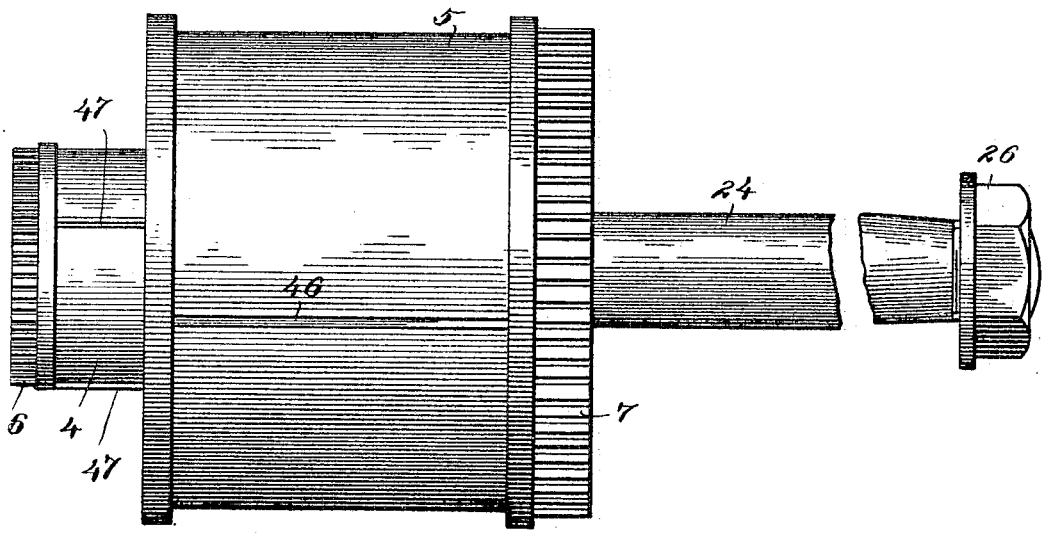
Witnesses.
L. Weissberg
O. C. Freiberg
Inventor.
Edward C. Warren
by Chas. G. Page
Atty

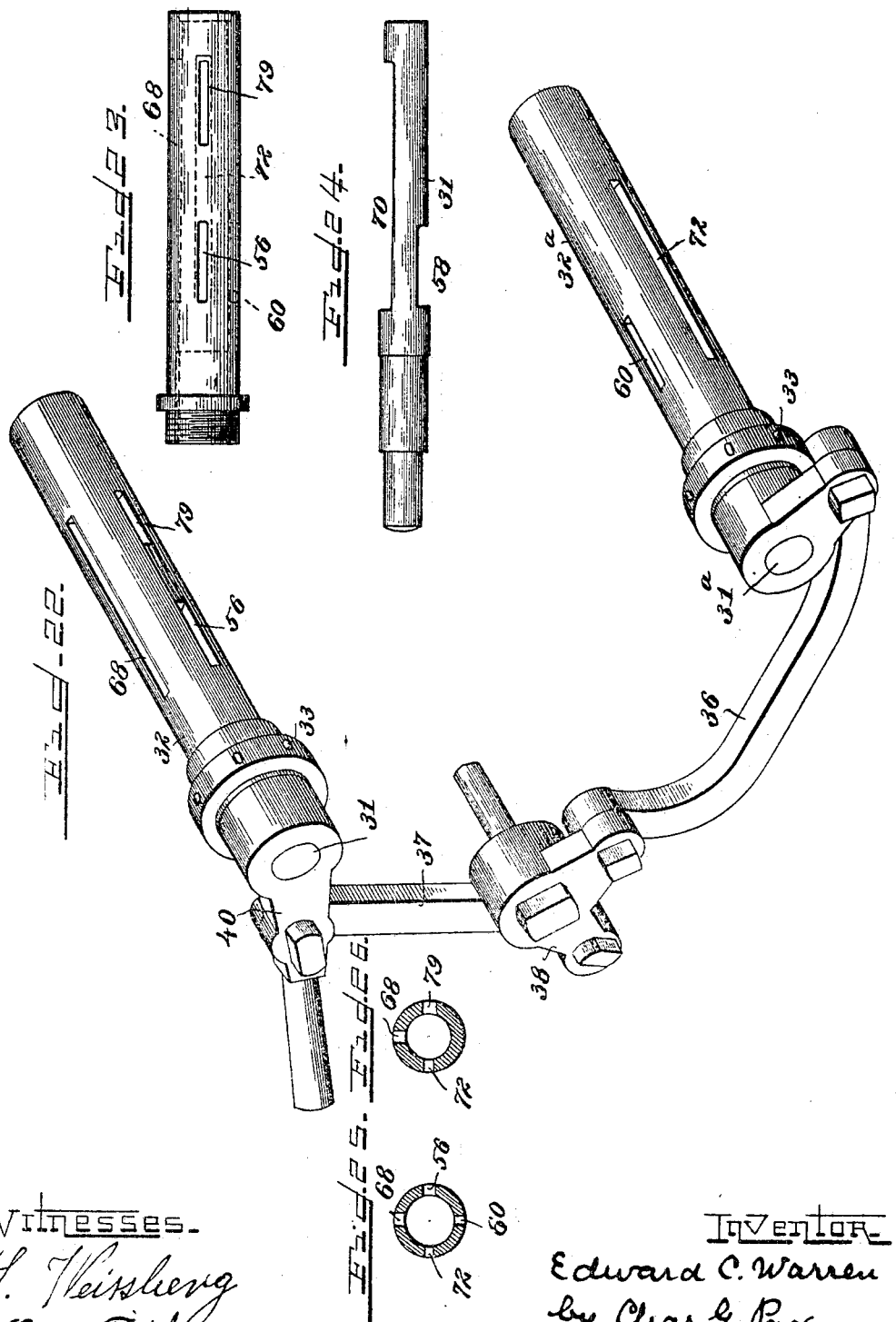

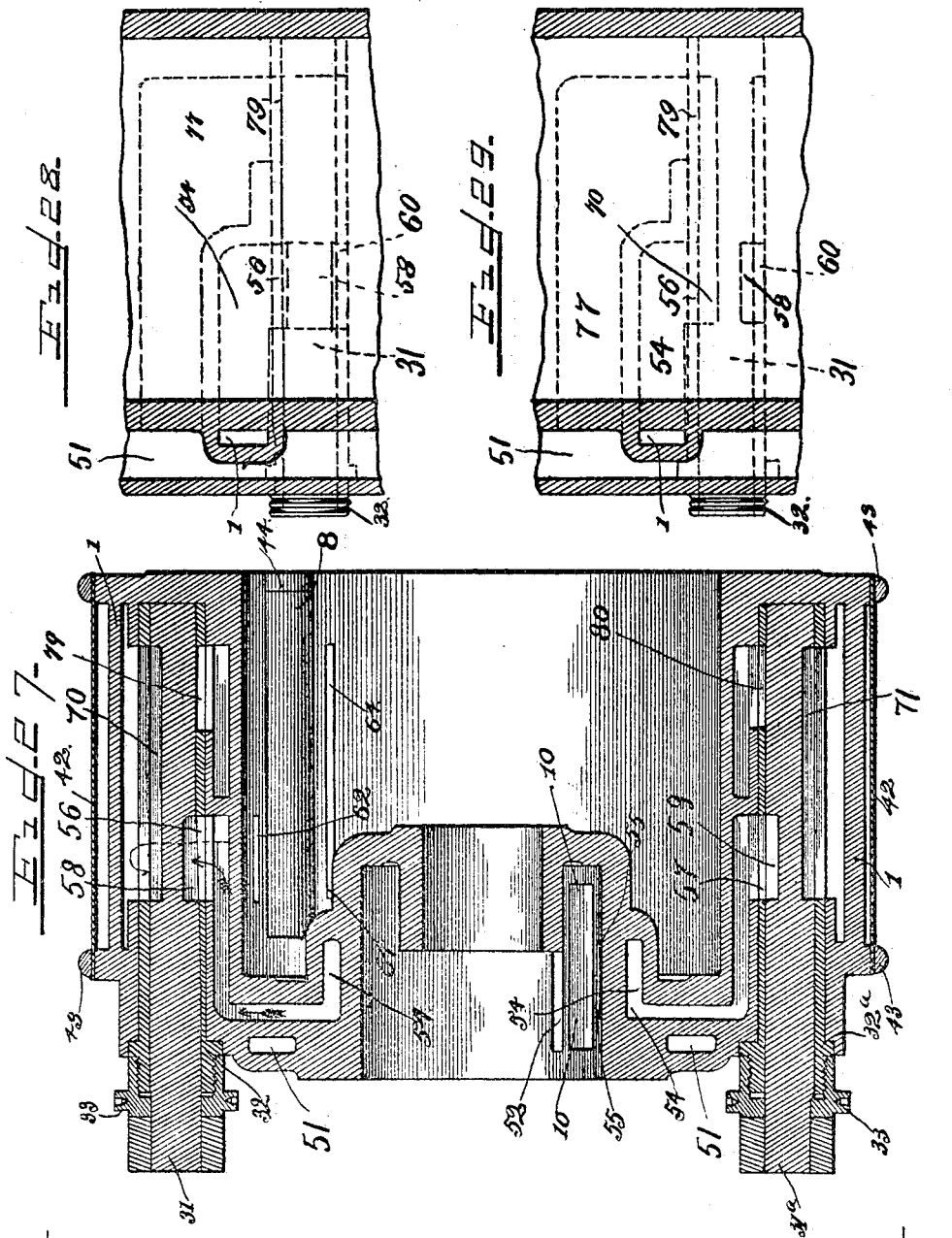

UNITED STATES PATENT OFFICE.

EDWARD C. WARREN, OF PROVIDENCE, RHODE ISLAND, ASSIGNOR TO THE ROTARY ENGINE COMPANY, A CORPORATION OF DELAWARE.

ROTARY ENGINE.

No. 798,848. Specification of Letters Patent. Patented Sept. 5, 1905.

Application filed November 29, 1901. Serial No. 84,073.

*To all whom it may concern:*

Be it known that I, EDWARD C. WARREN, a citizen of the United States, residing at Providence, county of Providence, and State of Rhode Island, have invented certain new and useful Improvements in Rotary Engines, of which the following is a specification.

My invention relates to rotary engines, and more particularly to rotary engines of the annular-chamber and rotary-abutment type, the invention also having particular reference to rotary engines which operate upon the compound or steam-expansion principle.

Generally stated, the object of my invention is to reduce the cost of manufacture and also to increase the efficiency of an engine of this character.

Certain special objects are to provide an improved and highly-efficient form of valve mechanism for reversing the engine; to arrange the rotary abutments in such manner as to shorten up or greatly reduce the length of certain of the steam-passages; to provide an arrangement whereby the steam-leakage may be economically employed for effecting the desired or proper lubrication of the various parts; to afford an arrangement whereby the lubricating-oil may be caused to flow between the moving or operative parts in such manner as to retard or hinder the leakage of the steam; to provide a construction whereby a plurality of pistons may be employed and whereby one piston may be brought partially within the other in such manner as to desirably and advantageously reduce the length of the engine; to provide a construction which will facilitate in assembling the various parts of which the engine is composed and which will also facilitate in taking the engine apart in case it may become desirable to repair or substitute new parts for broken or worn-out portions; to provide a form of reversing-valve mechanism by which the engine can be effectively and efficiently reversed by neutralizing the high-pressure piston and admitting live steam directly to the low-pressure piston; to provide a construction and arrangement of the parts which will insure strength and rigidity, and to provide certain details and features of improvement tending to increase the general efficiency and serviceability of a rotary engine of this character.

To the foregoing and other useful ends my invention consists in matters hereinafter more fully set forth.

In the accompanying drawings, Figure 1 is a horizontal section taken centrally through a compound reversible rotary engine involving the principles of my invention. Fig. 2 is a vertical section on line 2 2 in Fig. 1. Fig. 3 is a vertical section on line 3 3 in Fig. 1. Fig. 4 is a transverse vertical section on line 4 4 in Fig. 3. Fig. 5 is a similar transverse section on line 5 5 in Fig. 3. Fig. 6 is a front elevation of a rotary engine, as shown in Fig. 1. Fig. 7 is a transverse or cross-section on line 7 7 in Fig. 1. Figs. 8, 9, and 10 are detail views illustrating the split horseshoe-shaped rings which are employed in connection with the abutments for the low-pressure piston. Fig. 11 is a view of the rear end of the engine, showing the cylinder-head removed so as to expose the gearing which connects the abutment-shafts with the low-pressure piston. Fig. 12 is a detail section of the gear-ring which is applied to the high-pressure piston and which meshes with the cogs or small gears on the high-pressure abutments. Fig. 13 is a longitudinal section through the high-pressure piston. Fig. 14 is a transverse section on line 14 14 in Fig. 1. Figs. 15, 16, and 17 illustrate the split horseshoe-shaped rings which are employed in connection with the high-pressure abutments and which are similar to the split rings or plates shown in Figs. 8, 9, and 10. Fig. 18 is a transverse section on line 18 18 in Fig. 1. Fig. 19 is a detail section through a portion of the cylinder-casing on line 19 19 in Fig. 18. Fig. 20 is a view showing the two pistons in section mounted on a shaft and removed from the engine. Fig. 21 is a view similar to Fig. 20, but showing the two pistons in elevation instead of in section. Fig. 22 is a perspective of my improved valve mechanism for reversing the engine. Fig. 23 is a detail elevation of one of the two bushings employed for inclosing the rotary reversing-valves. Fig. 24 is a detail elevation of one of the said rotary reversing-valves. Figs. 25 and 26 are cross-sections of the bushing shown in Fig. 23. Fig. 27 is a section through the main portion of the engine-casing and also through the reversing-valves, the sections being taken on the irregular line 27 27 in Fig. 4. Figs. 28 and 29 are detail views more or less diagrammatic in character and showing the manner in which one of the reversing-valves and the adjacent ports or cored passages coöperate to reverse the engine.

The rotary engine thus illustrated is compound or steam-expanding in character and comprises the main cylinder-casing 1, the low-pressure-cylinder head 2, the high-pressure-cylinder head 3, the casing and heads thus provided and arranged being adapted to inclose the high and low pressure pistons 4 and 5. These pistons are, it will be observed, cylindric in form, and the high-pressure piston is preferably provided with a ring-gear 6, while the low-pressure piston is provided with a similar ring-gear 7. It will be observed that the said high-pressure piston is relatively small, while the low-pressure piston is relatively large. The ring-gear for the high-pressure piston is preferably secured in any suitable manner to its outer or forward end, while the ring-gear for the low-pressure piston is preferably secured to the latter's outer or rear end. Both pistons are secured in any suitable manner to the main shaft 24. This main shaft is preferably tapered at its forward end to receive the high-pressure piston and is also preferably provided at this end with a reduced threaded portion adapted to receive a nut for clamping or securing the high-pressure piston in place.

The main casing, it will be observed, is so formed or constructed as to provide a cylindric or annular chamber for the low-pressure piston and also a smaller chamber adapted to receive the cylindric high-pressure piston. This is shown in Fig. 7, wherein it will be seen that the chamber or the portion of the casing which incloses the high-pressure piston extends within the chamber which incloses the low-pressure piston. In this way the pistons are brought one within the other, and the length of the engine is thereby considerably reduced. The rotary abutments 8 are arranged, preferably, at each side of the low-pressure piston and are preferably and desirably provided with gears 9, adapted to engage the ring-gear 7 on the said low-pressure piston. The high-pressure abutments 10 are preferably similar to the low-pressure abutments and are located substantially above and below the high-pressure piston. As shown in Fig. 4, for example, these high-pressure abutments are arranged at an angle with respect to the low-pressure abutments, the upper high-pressure abutment being at one side of the center and nearer the low-pressure abutment at that side and the high-pressure abutment below the shaft being located at the opposite side of the center line and somewhat nearer the low-pressure abutment at this side. Each high-pressure abutment is preferably provided with a cog or gear wheel 11, adapted to engage the toothed ring or ring-gear 6 on the high-pressure piston.

At the rear of the engine the shaft 24 is preferably and desirably supported in a suitable bearing composed, preferably, of the outboard bearing 12, the outboard-bearing cap 13, bolted or secured thereto, and the thrust-bearings and half-couplings 14 and 15. It will also be observed that this bearing structure includes a half-coupling 16. Leakage through the shaft-bearing as constructed is preferably prevented by a stuffing-box composed of the stuffing-box gland 17 and the gland-collar 18. This gland-collar is preferably backed by the bushing 19 and 20, which forms the main bearing for the shaft. Thus constructed the shaft bearing two pistons is suitably mounted for rotation and held against end play by the thrust-bearing composed of the outboard bearing and the adjacent parts arranged outside of the stuffing-box. With this arrangement the pistons can be arranged to run free and have their end parts or surfaces stand clear of the inner surface of the casing.

Bushings 21 are preferably and desirably provided for the low-pressure-abutment spindles and similar bushings 22 are provided for the high-pressure-piston spindles. These high-pressure-abutment spindles are also provided with inner bushings 23. A nut 25 is adapted to screw onto the forward end of the main shaft and, as stated, is for the purpose of clamping the high-pressure piston firmly upon the main shaft. A similar nut 26 is screwed onto the rear end of the said shaft and is designed to clamp or hold the thrust-bearing and half-coupling 14 tightly upon the tapering portion of said shaft. With this arrangement the flanged inner end of the thrust-bearing is held firmly between the outboard bearing 12 and the thrust-bearing cap or plate 13. The half-coupling 16 can be employed for connecting the engine-shaft with the machinery or devices which are to be driven by the engine.

As will be observed, each low-pressure abutment is preferably cylindric in form and mounted upon a spindle 27. As stated, these abutment-spindles are supported for rotation in the bushings 21, arranged at the opposite ends of the abutments. The high-pressure abutments are likewise preferably mounted upon spindles 28, and these spindles, as previously explained, are supported for rotation in the bushings 22 and 23. These spindles for the high-pressure abutments preferably extend through at each end, and the high-pressure-cylinder head is preferably provided with caps 29, adapted to cover the outer ends of the bushings 22 and the said spindles 28. It will also be observed that these spindles are preferably hollow—that is to say, that they are formed with longitudinal bores opening at each end into the bushings 22 23. The low-pressure-abutment spindles are also preferably provided with longitudinal passages, and these passages through the abutment-spindles, in connection with the oil-ducts through the main shaft, (see particularly Fig. 1,) afford suitable channels whereby the leakage over the flanges of the high-pressure piston and thence through the different parts may be utilized for the purpose of carrying the lubricating-oil between the parts which move relatively to each other. Preferably, as will be observed, no mechanical packing is employed, and this being the case there is necessarily some leakage. However, as stated, the leakage from the high-pressure piston is conducted through suitable channels and forced to escape into the low-pressure cylinder in such manner as to carry with it a suitable quantity of lubricating-oil. In this way I not only take advantage of the steam-leakage for the purpose of insuring proper lubrication of all the operative parts, but I also apply the oil in such manner that it tends to retard or hinder such leakage, thereby obviating the necessity of providing packing.

Preferably the low-pressure-abutment spindles project through at each end—that is to say, are of a length to extend through the casing—and these exposed end portions are preferably covered by threaded caps 30, which are similar to the caps 29. With this arrangement ready and convenient access may be had to the abutment-bearings either for the purpose of cleaning or additional lubrication.

As will be hereinafter explained, the engine-casing is provided with suitable ports or passages for conducting the steam first to the high-pressure piston and for then exhausting the steam from this piston directly into the chamber containing the low-pressure piston. In this way, as previously stated, the engine is of the compound or steam-expanding type, and in order that the engine may be reversed at will I provide a pair of reversing-valves 31 and 31ᵃ, recessed and otherwise adapted to coöperate with said ports or passages in controlling the admission and exhaust of the steam to and from the pistons. These valves are rotatable for the purpose of permitting the order of admission and exhaust to be reversed—that is to say, for the purpose of permitting the admission of steam to be reversed in such manner as to reverse the rotation of the piston-shaft. As an effective and efficient method of reversing the engine said valves and ports or passages are preferably of such character as to render the high-pressure piston neutral when the engine is reversed. When the valves are in position to drive the engine forward or in a go-ahead direction, the steam is, as explained, first admitted to the high-pressure piston and is then exhausted from the chamber containing this piston to the chamber containing the low-pressure piston. When it passes from the high-pressure piston to the low-pressure piston, the steam expands, and in this way the efficiency of the engine is increased as a result of using the steam expansively in the well-known manner. The said rotary valves are preferably mounted in bushings 32 and 32ᵃ, which are ported or apertured to afford communication through the valve from one passage to the other. Referring particularly to Fig. 3 and also to Fig. 22, it will be seen that the outer portion of each valve-bushing is preferably provided with a cap 33. Located between the outer ends of these valves is the oil-fitting 34, provided externally with an acorn-nut 35, which affords a simple and effective device for introducing the oil into the duct or channel extending longitudinally through the forward portion of the main piston-shaft. A pipe or other suitable conductor can be employed for conducting oil to this fitting, and, as stated, the pressure of the steam leaking from the flanges of the high-pressure piston will carry the oil forward into the piston-shaft passage and force it into the bearings provided by the bushings 19 and 21ᵃ. The outer end portions of the reversing-valves thus arranged at opposite sides of the oil-fitting can be connected for simultaneous adjustment in any suitable manner. For example, this simultaneous adjustment can be accomplished by providing a horizontally-disposed link 36 and a vertically-disposed link 37. This horizontally-disposed link can be arranged to connect a pivotally-mounted bell-crank 38 with the crank-arm 39, the latter being secured to the outer end of the valve 31ᵃ. The other arm of this bell-crank 38 is connected with the reversing-lever 40 by means of the aforesaid vertically-disposed link 37. This reversing-lever, it will be observed, is secured to the outer end of the reversing-valve 31. As shown in Fig. 6, for example, and also in Fig. 22, the valve mechanism thus constructed is shown in the go-ahead position, the lever being depressed. In order to reverse the engine, it is only necessary to lift the lever 40, so as to partially rotate the said rotary valves, this rotary adjustment operating to change or alter the course of the steam through the passages in such manner as to admit live steam directly to the low-pressure piston. As stated, a reversal of the engine also involves a neutralization of the high-pressure piston by admitting steam through both the admission and exhaust ports of the latter. In this way, as previously stated and as will hereinafter more fully appear, the engine when running backward is running under high pressure in what is normally the low-pressure cylinder and with a neutralized or idle high-pressure piston. The reversing-valve mechanism, it will be observed, is advantageously and conveniently arranged at the forward end of the engine and outside of the thin metallic cap or head-cover 41, which is shown as inclosing the cylinder-head for the high-pressure cylinder and piston.

As a matter of mechanical construction or detail the main portion of the engine-casing can be inclosed by a lagging 42. This lagging can be held in place by lagging-strips 43. It will also be observed that in each case the rotary abutment and its cog or gear are formed integral and connected by a sort of hub portion, leaving an annular groove or space between them. Into these annular spaces or grooves are seated the abutment-plates or horseshoe-shaped rings 44, the latter for the low-pressure abutments, and similar plates or horseshoe-shaped rings 45 for the high-pressure abutments. Referring to Figs. 7 to 10, inclusive, it will be seen that these abutment-plates or horseshoe-shaped rings for the low-pressure abutments are preferably split, so as to permit them to be properly adjusted on the hub portion connecting the abutment with its cog or gear. It will also be seen that the concave edge portion with which each ring or plate is provided renders it, as stated, substantially horseshoe-shaped in form and adapts it for contact or engagement with the annular peripheral flange on the rear end of the low-pressure piston. This flange on the rear end of the low-pressure piston is fitted in the bore of the low-pressure cylinder, and these horseshoe-shaped rings or plates 44 form a tight joint and practically form continuations of the piston-flange.

Referring to Figs. 14 to 17, inclusive, it will be seen that the plates or rings 45 for the high-pressure abutments are similar in form to those just described in connection with the low-pressure abutments. These horseshoe-shaped rings or plates for the high-pressure abutments are also preferably split or made in two sections in view of the fact that the abutments and their cogs or gears are, as explained, made integral. With this integral formation of the gears and abutments the said horseshoe-shaped rings or plates are necessarily split or made in sections in order that they may be adjusted into place on the hub portions which connect their abutments with their respective gears or cogs.

Referring to Figs. 20 and 21, it will be seen that each piston is, as stated, cylindric in form and that these pistons are provided at their opposite ends with peripheral flanges which fit the bore portions of the cylinder-casing. Each piston is preferably provided with three piston projections or vanes arranged between the said flanges. For example, the low-pressure piston is provided with the three piston projections or vanes 46, arranged at regular intervals around the circumference of the piston, and the smaller or high-pressure piston is provided with a similar trio of piston projections or vanes 47. The low-pressure abutments are provided peripherally with notches 48, and the high-pressure abutments are provided in a similar way with notches 49. With this arrangement the abutments make three rotations while the pistons are making one, and consequently the gearing between the pistons and the abutments is proportioned three to one. The cylinder-casing is adapted to afford suitable recesses or chambers for the said abutments, and, referring to the cross-sections, it will be seen that each abutment is preferably provided at its back with a balancing chamber or recess. These balancing chambers or recesses are filled with steam when the engine is in use, and the pressure of the steam in these balancing chambers or recesses operates to balance the pressure exerted upon the abutments by the steam in the piston-chambers. In this way the abutments are perfectly balanced and mounted to turn freely and without any undue friction.

As previously stated, and as shown, for example, in Figs. 1, 20, and 21, it will be seen that the high-pressure piston extends practically within the low-pressure piston, the relative proportion being such as to readily permit this arrangement. In this way the two pistons are brought together in such manner as to greatly reduce the length of the engine, and it will also be seen that this arrangement tends to shorten the length of the passages extending between the two cylinders. It will be readily understood that it is desirable to have the passages through which the steam is exhausted from the high-pressure cylinder to the low-pressure cylinder as short as possible. This I accomplish by the arrangement of the pistons and also by the aforesaid arrangement of the high-pressure abutments.

The relative formation of the pistons and the casing is such as to provide space or clearance at the ends of the pistons, so as to reduce to a minimum the contact necessary to provide tight joints between the pistons and the casing. With this arrangement the end walls of the cylinder-chambers are practically formed by the peripheral flanges on the pistons. As previously explained, the thrust-bearing is particularly adapted for preventing end play on the part of the pistons, and is therefore of such character as to be readily adjustable for the purpose of properly adjusting the pistons within their respective cylinder-chambers. This construction is designed to permit high speed on the part of the engine in order to secure high efficiency. The engine is therefore, as stated, preferably constructed without packing of any sort, and with the steam-pressure balanced on all of the rotary parts in such manner as to reduce friction and uneven wearing to a minimum. In other words, there is no binding or rubbing between the parts, and the steam-pressure is so balanced as to permit the engine to run smoothly and at great speed.

The operation of the rotary engine thus constructed is as follows: Referring more particularly to Figs. 2 and 18, steam is admitted from the pipe 50 to the annular steam-space 51 surrounding the high-pressure chamber. From this annular steam-space steam is admitted directly to the high-pressure piston through the ports 52 and 53. The admission of steam to the high-pressure cylinder in this manner operates to rotate the high-pressure piston in the direction indicated by the arrow, it being understood that pressure is exerted between the cylindric rotary abutments and the vanes or projections on the outer surface of the pistons. The exhaust then takes place from the high-pressure-piston chamber by way of the ports 54 and 55, the steam passing through the openings 56 and 57 in the valve-bushings, and thence through the recesses 58 and 59 in the cylindric rotary valves, thence through the ports 60 and 61 in the valve-bushings, and finally through the ports or passages 62 and 63 in the cylindric casing and into the chamber containing the low-pressure piston. Thus the exhaust is conducted from the high-pressure piston to the chamber containing the low-pressure piston, and the steam thus operating expansively drives the low-pressure piston in the same direction as the live steam operates to drive the high-pressure piston. The exhaust from the low-pressure-piston chamber then takes place through the ports or openings 64 and 65, which open into the passages 66 and 67, extending around the low-pressure chamber. From these relatively long passages 66 and 67 the exhaust passes through the ports or slots 68 and 69 in the valve-bushings, thence through the recesses 70 and 71 in the cylindric rotary valves, then through the ports or slots 72 and 73 in the valve-bushings, and finally into the exhaust-passages 74 and 75, which communicate with the ultimate exhaust-opening 76. In this way the live steam is, as explained, conducted first to the high-pressure chamber, where it exerts pressure between the high-pressure-piston projections and the high-pressure abutments, and where it thereby acts to rotatively drive the pistons in the direction indicated by the arrow. The exhaust-steam from the high-pressure-piston chamber then passes through the reversing-valves and enters the low-pressure chamber, where it expands between the low-pressure abutments and the projections on the low-pressure piston, and where it thereby further contributes to the rotary movement of the piston-shaft. It will be observed at this juncture that the three-to-one portion of the gearing and the three piston projections and one abutment notch or recess coöperate to place the abutment recesses entirely out of the piston-chambers at the time of steam-admission. This is an advantageous arrangement, as it avoids the necessity of having the steam fill the abutment-recesses before exerting the requisite pressure on the piston-vanes. In other words, the steam when admitted acts instantaneously on the piston to drive it in the desired direction. As previously explained, the absence of any packing in the engine makes it possible to utilize the leakage around and over the pistons for forcing or carrying the lubricating-oil between the relatively moving parts, and in this way the constant and even flow of steam through the passages and through the clearance-spaces operates to keep the engine thoroughly lubricated. It will also be seen, as previously stated, that the flow is of such character as to carry the oil into recesses where it may to some extent accumulate, and thereby tend to retard or hinder the leakage of the steam. In this way and by running the engine at high speed a high efficiency is secured and the loss from leakage reduced to a minimum. As previously explained, the engine is preferably reversible in character, and when reversed the high-pressure piston is preferably neutral—that is to say, the steam is admitted to the high-pressure chamber through all four of the ports, so as to exert an equal pressure on both sides of the piston vanes or projections. While the high-pressure piston is thus rendered neutral, live steam is permitted to enter directly into the low-pressure-piston chamber, thereby converting the piston that is normally a low-pressure piston into a high-pressure piston. This is an effective and advantageous method of operation and permits the engine to run backward in an effective manner even though the steam is not employed in this case expansively. By reversing the engine in this manner the construction of the reversing-valves and the system of ports or passages can be greatly improved and simplified in character. To reverse the engine in this manner, it is, as previously explained, only necessary to raise or lift the lever 40, so as to partially rotate the rotary reversing-valves, and thereby change the order of admission and exhaust. When the valves are rotated by lifting the lever 40, the live steam is not only permitted to enter the high-pressure piston through the normal admission-ports 52 and 53, but also by way of the normal exhaust-ports 54 and 55, it being observed that when the valves are reversed the passages 77 and 78, leading from the annular chamber 51, are thrown into communication with the exhaust-passages 54 and 55 by reason of the relatively long recesses 70 and 71 being adjusted so as to connect the ports of slots 56 and 57 in the valve-bushings with the slots or openings 68 and 69, which latter are also provided in the said valve-bushings. Thus when the valves are reversed live steam passes from the annular chamber 51 into the ducts or passages 77 and 78, thence through the ports or openings 79 and 80 in the valve-bushings, then through the said long recesses in the valves, then through the ports or openings 56 and 57 in the valve-bushings, and finally through the exhaust-passages 54 and 55 into the high-pressure-piston chamber. In this way when the engine is reversed steam passes directly from the live-steam chamber 51 into the high-pressure chamber at one side of the piston vanes or projections and also from this chamber 51 through the valves and into the high-pressure chamber, so as to exert pressure on the opposite side of said vanes or projections. With the live steam thus admitted on both sides of the piston vanes or projections the high-pressure piston is neutralized and does not contribute to the backward movement of the engine-shaft. It will be seen, however, that as soon as the engine is reversed the long recesses in the rotary reversing-valves establish communication between the live-steam supply in the passages 77 and 78 and the normal exhaust-passages 66 and 67. When the valves are reversed, live steam passes from the passage 77 through the ports 79 in the bushing 32 and through the long recess 70 in the valve 31 to the long port or opening 68 in the top of the valve-bushing, thence into the normal exhaust-passage 67, and finally through the normal exhaust-port 65 into the chamber of the low-pressure piston. At the same time that live steam is thus being admitted through valve 31 into the low-pressure chamber live steam is passing in a similar way from passage 78 through the port or opening 80 into the long recess 71, thence through port 69 to the normal exhaust-passage 66, and finally through the normal exhaust-port 64 into the low-pressure piston-chamber. Thus in reversing the valves the long recesses with which they are provided operate to connect up the valve-ports and passages in such manner as to admit live steam directly into the low-pressure chamber at opposite points. The exhaust from this low-pressure chamber when thus used as a high pressure is through the normal admission-ports 62 and 63, through the short recesses 58 and 59 in the valves, thence through the long ports or openings 72 and 73 in the valve-bushings, and finally into the exhaust-passages 74 and 75, which lead to the ultimate exhaust-opening 76. In this way, as stated, the engine is effectively reversed, and when thus reversed, even though the steam is not employed expansively, it will readily be seen that a decided advantage is gained in the way of simplicity of valve construction and port arrangement. It is desirable in an engine of this type that provision be made whereby it may be reversed; but it is also important that this reversing feature be not of such character as to necessitate a complicated valve construction and also a complicated system of ports. It will readily be seen, therefore, that by thus neutralizing the high-pressure piston and depending merely on the low-pressure piston in reversing that it is possible to greatly simplify the reversing-valves and the system of ports, and to thereby reduce the cost of manufacture. Furthermore, such construction and method of operation tends to decrease the liability of breakage and to render the engine more serviceable and certain in operation.

Thus it will be seen that my invention permits the provision of a simple and effective construction and of a compound reversible rotary engine particularly adapted for high speed. A rotary engine of this character is capable of efficient service in various ways—as, for example, in running automobiles, dynamos, and also many other machines or devices which require in some cases a steady and even speed and which in other cases require ready and easy control with reference to starting and stopping and also with respect to a reversal of the motion. Furthermore, the construction of an engine thus embodying the principles of my invention is so simple and of such character as to cheapen or reduce the cost of manufacture. The parts all fit and come together nicely, and, as stated, the formation and arrangement of the parts insure great strength and rigidity. High speed with absolute safety and without danger of uneven wearing or breakage are also some of the advantages which I gain by the aforesaid construction and method of operation. It will be seen, however, that the various details and features of my invention can be more or less modified or changed without in any way departing from the spirit of my invention. For this reason I do not limit myself to the exact construction shown and described.

What I claim as my invention is—

1. A rotary engine comprising a plurality of concentric rotary pistons of different diameter, mounted upon a common shaft and extending one within the other, a suitably-ported cylinder-casing adapted to inclose said pistons and having an inclosing portion for the smaller piston extending within the larger piston, and rotary abutments for the smaller of said pistons also extending within said larger piston, substantially as described.

2. A rotary engine comprising a plurality of pistons axially alined and extending one within the other, a plurality of rotary abutments for said pistons, the rotary abutments for the smaller of said pistons extending within the larger of said pistons, and a suitably-ported cylindric casing for inclosing said pistons and abutments, substantially as described.

3. A rotary engine comprising a relatively large cylindric piston with fixed peripheral vanes mounted upon a shaft, a relatively small cylindric piston with similar vanes also mounted upon said shaft concentrically with the large piston and extending within it, and suitably-ported cylindrical casings fitted each with rotary abutments for inclosing said piston, substantially as described.

4. A compound rotary engine comprising a relatively large and a relatively small piston both mounted upon a common shaft, the relatively small piston extending within the interior of the relatively large piston, rotary abutments for said pistons, the rotary abutments of the small piston extending also within the interior of the relatively large piston, and a suitably-ported cylinder-casing for inclosing said pistons and abutments, substantially as described.

5. A compound rotary engine comprising a relatively large and a relatively small piston mounted upon a common shaft, the latter extending within the former, rotary abutments associated respectively with said relatively small and large pistons, gearing for connecting said pistons with said abutments, and a suitably-ported casing for inclosing said abutments, gearing and pistons, the steam being exhausted from the relatively small piston into the chamber containing the relatively large piston, substantially as described.

6. A compound rotary engine comprising a plurality of cylindric pistons mounted upon a common shaft and extending one within the other, a suitably-ported casing inclosing said pistons and having clearance-space between its interior and the ends of the pistons, a thrust-bearing for said shaft adapted to prevent end play on the part of said pistons, rotary abutments for said pistons, and a three-part ported casing inclosing said pistons and supporting said thrust-bearing, a stuffing-box being interposed between said thrust-bearing and the interior of the engine, substantially as described.

7. A compound rotary engine comprising a relatively large piston mounted upon a piston-shaft, a relatively small piston mounted upon the same shaft, a ported cylinder-casing inclosing said pistons, there being clearance-space between the ends of the pistons and the inner surfaces of the cylinder-casing, and a thrust-bearing arranged outside of the cylinder-casing and adapted to prevent end play on the part of said shaft, substantially as described.

8. A compound rotary engine comprising a rotary piston with peripheral vanes mounted upon a shaft, a three-part cylinder-casing inclosing said piston and provided with suitable ports or passages and with a clearance-space at the end of the piston, and a thrust-bearing supported by the casing but outside of it, said thrust-bearing being adapted to prevent end play on the part of said shaft, substantially as described.

9. In a rotary engine, a piston mounted upon a shaft, a cylinder-casing inclosing said piston and having clearance between its inner surfaces and the ends of said piston, a shoulder upon said piston exposed to the internal pressure of the engine, and a thrust-bearing exterior to said casing, opposing movement of the shaft in the direction in which it is impelled by said internal pressure, substantially as described.

10. A compound rotary engine comprising relatively large and small pistons mounted in common upon a rotary shaft, rotary abutments for said pistons, gearing between said pistons and said abutments, a ported casing inclosing said pistons and abutments and also the gearing and having clearance between its inner surface and the ends of the piston and also between its inner surface and the said gearing, a suitable thrust-bearing exterior to said casing for preventing end play on the part of said shaft, and a stuffing-box interposed between said thrust-bearing and the larger of said pistons, substantially as described.

11. A compound rotary engine comprising a plurality of cylindric pistons extending one within the other and mounted upon a common shaft, a ported cylinder-casing for inclosing said pistons, clearance-space between the ends of the pistons and the inner surface of the cylinder-casing, and a suitable thrust-bearing applied to the projecting end portion of said shaft and adapted to prevent end play on the part of said pistons, substantially as described.

12. A compound rotary engine comprising a plurality of cylindric rotary pistons axially alined and extending one within the other, a shaft common to all of said pistons, a cylinder-casing inclosing said pistons and one end of said shaft, there being clearance-space with reference to the meeting surfaces of the pistons and the casing, and a thrust-bearing arranged adjacent to the larger of said pistons and applied to the projecting end portion of said shaft, so as to prevent end play on the part of said pistons within the casing, substantially as described.

13. A compound rotary engine comprising relatively large and small pistons axially alined and connected to rotate in unison, a suitable cylinder-casing for inclosing said pistons, said casing being suitably ported and provided with clearance-spaces with respect to the pistons, and a thrust-bearing exterior to said casing having suitable connection with said pistons and adapted to prevent end play on the part of the latter, substantially as described.

14. A compound rotary engine comprising a plurality of pistons mounted upon a common shaft, said shaft being provided with longitudinally and transversely extending oil-ducts, rotary abutments for said pistons, ring-gears applied to the ends of said pistons, cogs or pinions for connecting said abutments with said ring-gears, a cylinder-casing inclosing said pistons, abutments and gearing and having clearance-spaces with respect to the same, means for introducing oil into the longitudinal oil-duct in said shaft, the steam-leakage around the ends of the pistons carrying the oil through said passages in the piston-shaft, and bearings for said shaft also lubricated by the oil thus carried through by the steam-leakage, the clearance-spaces and passages thus provided also serving as channels through which the steam-leakage carries the lubricating-oil from one piston-chamber to the other, substantially as described.

15. A compound rotary engine comprising a plurality of pistons axially alined upon a common shaft, said pistons extending one within the other, toothed rings or ring-gears applied to the opposite ends of said pistons, rotary abutments mounted in suitable bearings and provided with integral cogs or gears adapted to engage said ring-gears on the pistons, and a suitably-ported cylinder-casing for inclosing said pistons, gearing and abutments, substantially as described.

16. In a rotary engine, the combination of a rotary piston and a rotary abutment, a gear on said piston, a pinion formed integral with said abutment and adapted to engage said gear, and a split ring or plate arranged between said pinion and said abutment, substantially as described.

17. In a rotary engine, the combination of a rotary shaft and a piston mounted thereon, a combined thrust-bearing and coupling secured upon a tapered end portion of said shaft, and an outboard bearing for engaging said thrust-bearing, so as to prevent end play on the part of said piston, substantially as described.

18. In a rotary engine, the combination of a piston, a shaft upon which the piston is mounted, a three-part cylinder-casing inclosing said piston and also one end of said shaft, a combined thrust-bearing and coupling secured to the projecting end of said shaft, and an outboard bearing secured to the casing or cylinder structure engaging said thrust-bearing, substantially as described.

19. In a rotary engine, a shaft having a tapered end portion, a plurality of cylindric pistons axially alined upon said shaft, one of said pistons being adapted to serve as a high-pressure piston, a nut whereby said high-pressure piston is secured upon the tapered end portion of said shaft, and means for securing said shaft in suitable bearings, the engine also comprising a suitable casing or cylinder structure for inclosing said pistons and also the tapered end portion of the shaft upon which the high-pressure piston is mounted, substantially as described.

20. In a compound rotary engine, the combination of relatively small and large pistons axially alined upon a common shaft, a cylinder-casing comprising a main or body portion providing a pair of chambers for said pistons, a pair of cylinder-heads secured on opposite sides of said casing, and inclosing said pistons, the cylinder-head for the relatively small piston-chamber inclosing but not supporting the end of said shaft, a nut for clamping or securing the relatively small piston upon a tapered portion of said shaft and a thrust-bearing applied to the projecting end portion on said shaft and adapted to prevent end movement on the part of said pistons, substantially as described.

21. A rotary engine comprising relatively small and large pistons, a shaft upon which said pistons are arranged, the relatively small piston extending within the relatively large piston, a casing or cylinder structure having a main or body portion adapted to provide a pair of piston-chambers for said pistons, a head secured to one side of the casing and inclosing said relatively small piston and also the end portion of the shaft, a cylinder-head secured to the opposite side of the casing and provided with a stuffing-box through which the shaft extends, and a thrust-bearing applied to the shaft outside of said stuffing-box, substantially as and for the purpose set forth.

22. A rotary engine comprising a plurality of cylindric pistons provided peripherally with end flanges, a shaft upon which said pistons are mounted, rotary abutments bearing against the pistons between the said flanges, a casing inclosing said pistons and abutments and having clearance-spaces between the inner surface and the ends of said pistons, and also clearance-spaces between the casing and the ends of the abutments, a thrust-bearing applied to the projecting end of said shaft and adapted to prevent end play on the part of said pistons and abutments, and a stuffing-box applied to the shaft between the thrust-bearing and said pistons, substantially as described.

23. In a rotary engine, the combination of a flanged piston, rotary abutments arranged between the said flanges, a shaft upon which said piston is mounted, gear-teeth on the piston, pinions formed integral with said abutments and engaging the gear-teeth on said pistons, and split horseshoe-shaped rings arranged between the said pinions and abutments and in line with one of said flanges, substantially as described.

24. In a rotary engine, the combination of a cylinder-piston provided with end flanges, a shaft upon which said piston is mounted, a suitable casing inclosing the same, a rotary abutment extending between said flanges, gear-teeth carried by said piston, a pinion engaging said gear-teeth and having a hub portion formed integral with said abutment, and a split horseshoe-shaped plate or ring encircling the said hub portion and arranged in line with one of said flanges on said piston, substantially as described.

25. A compound rotary engine comprising a plurality of flanged pistons axially alined on a common shaft, rotary abutments for said pistons arranged to extend between said flanges, a casing inclosing said abutments and pistons, thrust-bearings for preventing end play on the part of said shaft, said pistons extending one within the other, the rotary abutments for one piston being arranged at each side of the latter, and the rotary abutments for the other piston being arranged substantially above and below the same, substantially as described.

26. In a compound rotary engine, the combination of a plurality of flanged pistons axially alined upon a common shaft, rotary abutments extending between the said flanges, ring-gears secured to the said pistons, pinions formed integral with said abutments and engaging said ring-gears, a casing inclosing said abutments and gearing and pistons and having clearance-spaces between the inner surface and the ends of the pistons and the abutments, a thrust-bearing applied to the projecting end of said shaft and adapted to prevent end play on the part of the pistons and abutments, and a stuffing-box interposed between the thrust-bearing and the pistons, substantially as described.

27. In a rotary engine, the combination of two pistons axially alined upon a common shaft, each piston having three longitudinal vanes, two rotary abutments for each piston, each abutment being provided with a single recess, three-to-one gearing for connecting said abutments to said pistons, whereby the abutments rotate three times to once on the part of the pistons, and a suitably-ported casing or cylinder structure inclosing said pistons, gearing and abutments, substantially as described.

28. In a compound reversible rotary engine, the combination of high and low pressure pistons, a suitably-ported casing inclosing said pistons, and reversing-valves adapted and applied for neutralizing the high-pressure piston and converting the low-pressure piston into a high-pressure piston, substantially as described.

29. A compound steam-engine comprising high and low pressure chambers, pistons in said chambers, and a pair of rotary valves for reversing the engine and adapted to neutralize the high-pressure piston and convert the low-pressure piston into a high-pressure piston, substantially as described.

30. A compound rotary engine comprising high and low pressure chambers, pistons in said chambers, a suitably-ported casing or cylinder structure, and a pair of connected rotary valves for reversing said engine and adapted in so doing to neutralize the high-pressure piston and convert the low-pressure piston into a high-pressure piston, substantially as described.

31. A compound reversible rotary engine, comprising relatively small and large pistons arranged upon a common shaft, rotary abutments for said pistons, a suitably-ported casing or cylinder structure inclosing said abutments and pistons, and a pair of connected rotary valves for reversing the engine whereby the relatively small piston is neutralized and the relatively large piston subjected to the action of high-pressure steam, substantially as described.

32. A compound reversible rotary engine, comprising relatively large and small pistons axially alined upon a common shaft and extending one within the other, rotary abutments for said pistons, a suitably-ported casing or cylinder structure inclosing said abutments and pistons, and a pair of connected rotary valves for reversing the engine whereby the normally high-pressure piston is neutralized and the normally low-pressure piston subjected to the action of high-pressure steam, substantially as described.

33. A compound reversible rotary engine comprising relatively large and small pistons, a shaft upon which said pistons are mounted, suitable abutments for said pistons, a suitably-ported casing or cylinder structure inclosing said abutments and pistons, and a pair of rotary valves each provided with relatively long and short recesses adapted to coöperate with said ports in reversing the engine, the long recesses of said valves being adapted to coöperate with certain ports in neutralizing the high-pressure piston, and also in converting the normally low-pressure piston into a high-pressure piston, substantially as described.

34. A compound reversible rotary engine comprising high and low pressure pistons, suitable abutments for the pistons, a suitably-ported casing or cylinder structure inclosing said abutments and pistons, and a reversing-valve device for reversing the engine and whereby live steam is admitted through both the admission and exhaust ports of the high-pressure-piston chamber, and whereby the order of admission and exhaust in the low-pressure-piston chamber is reversed, and the latter thereby converted into a high-pressure piston, substantially as described.

35. A compound rotary engine comprising high and low pressure pistons, a shaft upon which said pistons are mounted, rotary abutments for said pistons, a pair of connected reversing-valves for reversing the engine, the abutments for the low-pressure piston being arranged at each side thereof, the abutments for the high-pressure piston being arranged substantially above and below the latter and adjacent to said reversing-valves, and a suitably-ported casing or cylinder structure inclosing said valves, pistons and abutments, the relative positions or arrangement of the abutments and reversing-valves tending to shorten up the steam-passages between the two piston-chambers, substantially as described.

EDWARD C. WARREN.

Witnesses:
JOHN H. FLANAGAN,
W. HERMAN GREED.